(12) United States Patent
Kumagai et al.

(10) Patent No.: US 10,168,945 B2
(45) Date of Patent: Jan. 1, 2019

(54) STORAGE APPARATUS AND STORAGE SYSTEM

(71) Applicant: Hitachi, Ltd., Tokyo (JP)

(72) Inventors: Naoko Kumagai, Tokyo (JP); Norihiko Kawakami, Tokyo (JP)

(73) Assignee: HITACHI, LTD., Tokyo (JP)

( * ) Notice: Subject to any disclaimer, the term of this patent is extended or adjusted under 35 U.S.C. 154(b) by 6 days.

(21) Appl. No.: 15/509,833

(22) PCT Filed: Oct. 29, 2014

(86) PCT No.: PCT/JP2014/078765
§ 371 (c)(1),
(2) Date: Mar. 8, 2017

(87) PCT Pub. No.: WO2016/067388
PCT Pub. Date: May 6, 2016

(65) Prior Publication Data
US 2017/0308321 A1    Oct. 26, 2017

(51) Int. Cl.
*G06F 3/06* (2006.01)
*G06F 12/00* (2006.01)

(52) U.S. Cl.
CPC .......... *G06F 3/0647* (2013.01); *G06F 3/0611* (2013.01); *G06F 3/0616* (2013.01); *G06F 3/0649* (2013.01); *G06F 3/0683* (2013.01); *G06F 3/0685* (2013.01); *G06F 12/00* (2013.01)

(58) Field of Classification Search
CPC .... G06F 3/0647; G06F 3/0611; G06F 3/0683; G06F 3/0685; G06F 3/0649; G06F 12/00; G06F 3/0616

USPC .......................................................... 711/117
See application file for complete search history.

(56) References Cited

U.S. PATENT DOCUMENTS

| 8,090,923 B2 | 1/2012 | Kawamura |
| 2013/0151804 A1* | 6/2013 | Alatorre ............ G06F 17/30165 711/170 |
| 2013/0290598 A1* | 10/2013 | Fiske .................... G06F 3/0625 711/103 |

OTHER PUBLICATIONS

International Search Report and Written Opinion for PCT App No. PCT/JP2014/078165 dated Jan. 20, 2015, 9 pgs.

* cited by examiner

*Primary Examiner* — Hua J Song
(74) *Attorney, Agent, or Firm* — Procopio, Cory, Hargreaves & Savitch LLP

(57) ABSTRACT

A storage apparatus includes: first storage devices; second storage devices that are lower in performance than the first storage devices; and a controller coupled to an external storage apparatus including third storage devices that are lower in reliability than the first storage devices and the second storage devices and coupled to the first storage devices and the second storage devices. The controller controls data migration between the first storage devices and the second storage devices based on an I/O frequency. When the total size of data stored for a predetermined period or more among data stored in the second storage devices is equal to or larger than a predetermined size threshold, the controller transmits the data stored in the second storage devices for the predetermined period or more, to the external storage apparatus.

6 Claims, 20 Drawing Sheets

FIG.2
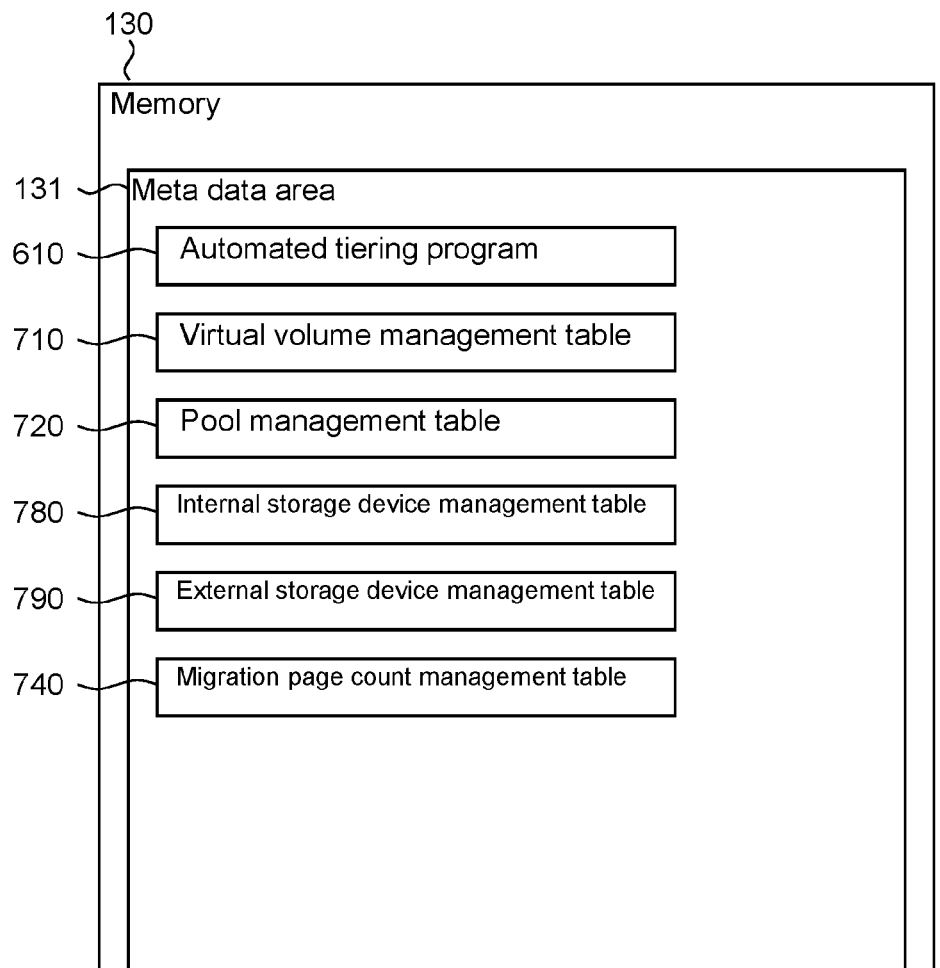
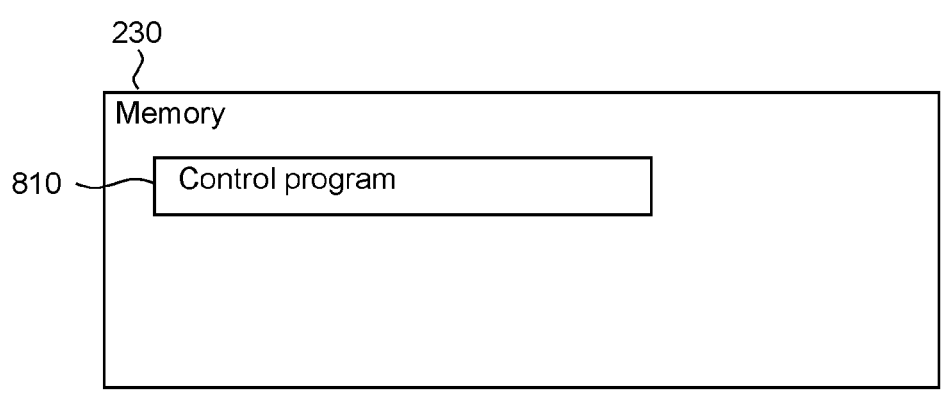

Virtual volume management table

| Virtual volume # | LBA | Virtual page # | Allocated real page # |
|---|---|---|---|
| 0 | 0000-0999 | 0 | 11 |
| | 1000-1999 | 1 | Unallocated |
| | 2000-2999 | 2 | 101 |
| | 3000-3999 | 3 | Unallocated |
| | ... | ... | ... |
| 1 | 0000-0999 | 0 | Unallocated |
| | ... | ... | ... |
| ... | ... | ... | ... |

720  
Pool management table

| Pool # | SLU # | Tier | Type | Real page # | Pool address | Allocation state | Write count | Read count | Previous storage Tier | T3 sojourn count α |
|---|---|---|---|---|---|---|---|---|---|---|
| 0 | 0 | 1 | Inside | 0 | 0x0000 | Allocated | 164 | 421 | 1 | - |
| | | | | 1 | 0x0010 | Unallocated | 0 | 0 | - | - |
| | | | | 2 | 0x0020 | Unallocated | 0 | 0 | - | - |
| | | | | ... | ... | ... | ... | ... | ... | ... |
| | | | | ... | ... | ... | ... | ... | ... | ... |
| | | | | 10 | 0x0100 | Allocated | 29 | 210 | 1 | - |
| | | | | 11 | 0x0110 | Allocated | 15 | 107 | 2 | - |
| | | | | 12 | 0x0120 | Unallocated | 0 | 0 | - | - |
| | | | | ... | ... | ... | ... | ... | ... | ... |
| | 1 | 2 | Inside | 20 | 0x0200 | Allocated | 2 | 8 | 2 | - |
| | 2 | 3 | Inside | 30 | 0x0300 | Allocated | 0 | 0 | 2 | 0 |
| | 3 | 3 | Inside | 40 | 0x0400 | Allocated | 0 | 0 | 3 | 2 |
| | 4 | 4 | T4 (Outside) | 100 | 0x1000 | Allocated | 0 | 0 | - | - |
| | 5 | 4 | T4 (Outside) | 110 | 0x1100 | Allocated | 0 | 0 | - | - |
| | 6 | 4 | T4 (Outside) | 120 | 0x1200 | Unallocated | 0 | 0 | - | - |
| | 7 | 4 | T4 (Outside) | 130 | 0x1300 | Unallocated | 0 | 0 | - | - |
| ... | ... | ... | ... | ... | ... | ... | ... | ... | ... | ... |

FIG.9

790 External storage device management table

| SLU# | SLU address | Tier | Type | EC group # | T4 apparatus # | T4 LU # | T4LU address |
|---|---|---|---|---|---|---|---|
| 4 | 0x0000 | 4 | T4 (Outside) | EC0 | 0 | 0 | 0x0000 |
| 5 | 0x0000 | 4 | T4 (Outside) | EC1 | | 1 | 0x0000 |
| 6 | 0x0000 | 4 | T4 (Outside) | EC2 | | 2 | 0x0000 |
| 7 | 0x0000 | 4 | T4 (Outside) | EC3 | | 3 | 0x0000 |
| ... | ... | ... | ... | ... | ... | ... | ... |

FIG.11

GUI screen

| # | Item | Threshold |
|---|------|-----------|
| 1 | α | 4 |
| 2 | β | 50 |
| 3 | Read count | 3 |

750 HDD group management table

| HDD Group name | HDD number | Write count |
|---|---|---|
| Group1 | CHDD1 | 6 |
| | CHDD2 | |
| | CHDD3 | |
| | CHDD4 | |
| | : | |
| Group2 | CHDD31 | 4 |
| | CHDD32 | |
| | CHDD32 | |
| | CHDD32 | |
| | : | |
| : | : | : |

STORAGE APPARATUS AND STORAGE SYSTEM

CROSS-REFERENCE TO RELATED APPLICATIONS

This application is a U.S. National Stage entry of PCT Application No: PCT/JP2014/078765 filed Oct. 29, 2014, the contents of which are incorporated herein by reference.

TECHNICAL FIELD

This invention relates to a storage apparatus and a storage system.

BACKGROUND ART

Due to the recent rapid increase in data volume, the capacity necessary for data storage has increased and the cost of enterprise storage is therefore increased.

Low-cost and large-capacity consumer storage, which is coupled to the outside of enterprise storage, is thus used. Consumer storage has an inexpensive consumer hard disk drive (HDD) mounted thereon, and is capable of storing large-volume data at low cost by migrating data from enterprise storage to consumer storage.

PTL 1 discloses a technology for writing data into an externally-coupled storage apparatus.

CITATION LIST

Patent Literature

[PTL 1]
U.S. Pat. No. 8,090,923

SUMMARY OF INVENTION

Technical Problem

Consumer HDDs are more inexpensive than enterprise HDDs (for example, about 1/10), but are more apt to fail. HDDs are more apt to fail as the frequency of access (read/write) becomes larger. For example, when the frequency of access is large, a magnetic head in an HDD moves frequently, and hence the probability of contact between the magnetic head and the disk is increased, which leads to increase in the failure rate.

More specifically, in a random access in which the data size is small and a data write position on the disk is unspecified, the magnetic head moves everywhere on the disk every time an access is made. In a sequential access, on the other hand, an access is made to a continuous area on the rotating disk, and hence the movement of the magnetic head is smaller than that in the random access. Thus, it is considered that the failure rate is higher in the random access than in the sequential access.

As the failure rate of HDDs becomes higher, the frequency of maintenance and replacement of the storage apparatus is increased, whereby the cost of a system including consumer storage is increased. Therefore, the frequency of access to an HDD in consumer storage needs to be decreased, but there is a problem in that enterprise storage cannot directly access an HDD in consumer storage. It is therefore an object of this invention to reduce the frequency of access from consumer storage to an HDD in the consumer storage by controlling enterprise storage to transmit data of a predetermined size or more collectively to the consumer storage.

Solution to Problem

In order to solve the above-mentioned problem, a storage apparatus according to one aspect of this invention includes: a plurality of first storage devices; a plurality of second storage devices that are lower in performance than the plurality of first storage devices; and a controller coupled to an external storage apparatus including a plurality of third storage devices that are lower in reliability than the plurality of first storage devices and the plurality of second storage devices and coupled to the plurality of first storage devices and the plurality of second storage devices. The controller is configured to: control data migration between the plurality of first storage devices and the plurality of second storage devices on the basis of an I/O frequency; and transmit, when a total size of data stored for a predetermined period or more among data stored in the plurality of second storage devices is equal to or larger than a predetermined size threshold, the data stored in the plurality of second storage devices for the predetermined period or more, to the external storage apparatus.

Advantageous Effects of Invention

According to one aspect of this invention, the failure rate can be reduced to suppress the frequency of maintenance and replacement by using low-cost consumer storage, thereby reducing the operational cost.

BRIEF DESCRIPTION OF DRAWINGS

FIG. 2 illustrates contents of a memory 130 in a storage apparatus 100 and contents of a memory 230 in a storage apparatus 200.

FIG. 6 illustrates a virtual volume management table 710.

FIG. 7 illustrates a pool management table 720.

FIG. 9 illustrates an external storage device management table 790.

FIG. 11 illustrates a GUI screen.

FIG. 18 illustrates an HDD group management table 750.

DESCRIPTION OF EMBODIMENTS

In the following description, information in this invention is described with the expressions "aaa table", "aaa list", "aaa DB", "aaa que", and the like. Information, however, may be expressed by another data structure than the table, list, DB, que, and the like. The "aaa table", "aaa list", "aaa DB", "aaa que", and the like are sometimes referred to as "aaa information" in order to indicate that the information is independent of the data structure.

Further, the contents of each information are described with the expressions "identification information", "identifier", "name", "name", and "ID", but those expressions can be replaced with one another.

In the following description, "program." is sometimes used as the subject, but a processor may be used as the subject because a program is intended to be executed by a processor to perform predetermined processing by using a memory and a communication port (communication control device). Processing disclosed with a program as the subject may be processing performed by a computer or an information processing apparatus such as a storage controller. A part or whole of the program may be implemented by dedicated hardware.

Various kinds of programs may be installed on each computer via a program distribution server or computer-readable memory media. In this case, the program distribution server includes a processor (such as a central processing unit: CPU) and storage resources, and the storage resources store therein a distribution program and a distribution object program. When the distribution program is executed by the CPU, the CPU on the program distribution server distributes the distribution object program to other computers.

Embodiments of this invention are described below with reference to the accompanying drawings.

Embodiment 1

Figure 1:
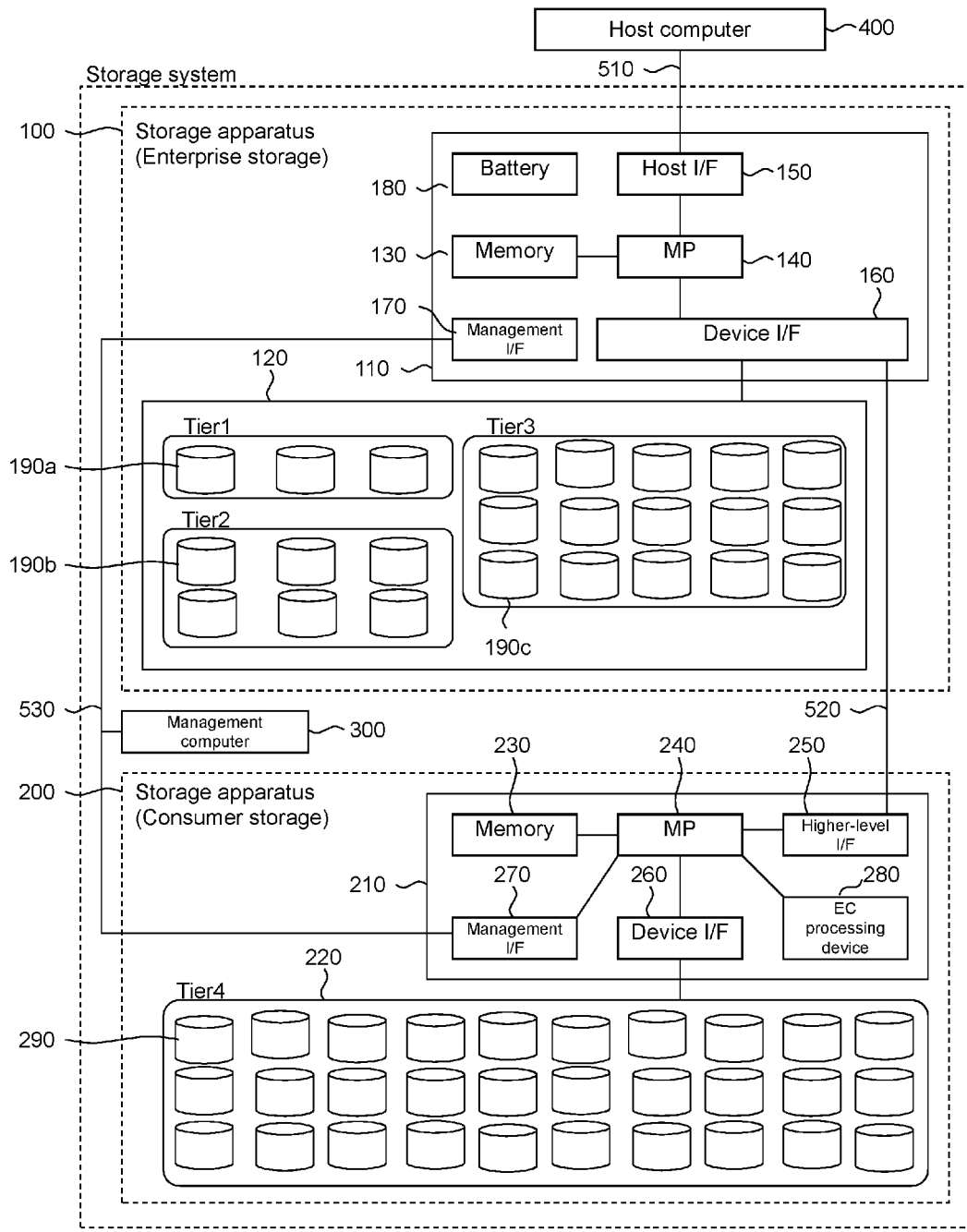
FIG. 1 illustrates a configuration of a storage system in Embodiment 1.

FIG. 1 illustrates a configuration of a storage system in Embodiment 1.

The storage system includes a storage apparatus 100, a storage apparatus 200, and a management computer 300. The storage apparatus 100 is coupled to a host computer 400 via a communication network 510. The storage apparatus 100 is enterprise storage, and the storage apparatus 200 is consumer storage. The storage apparatus 200 is a storage apparatus that is coupled to the outside of the storage apparatus 100 accessed by the host computer 400, and hence the storage apparatus 200 is referred to as external storage apparatus. The communication network 510 is, for example, a storage area network (SAN), and transfers to be written into the storage apparatus 100 from the host computer 400 and data to be read onto the host computer 400 from the storage apparatus 100. The storage apparatus 200 is coupled to the storage apparatus 100 via a communication network 520. The communication network 520 is, for example, a SAN, and transfers data to be written into the storage apparatus 200 from the storage apparatus 100 and data to be read onto the storage apparatus 100 from the storage apparatus 200. A communication network 510 is, for example, a local area network (LAN). The management computer 300 is coupled to the storage apparatus 100 and the storage apparatus 200 via the communication network 530. The communication network 530 transfers information used to control the storage system. In the present embodiment, each of the storage apparatus 100 and the storage apparatus 200 is block storage to be accessed in units of blocks of a predetermined size. The storage apparatus 100 may be file storage to be accessed in units of files or unified storage to be accessed in units of blocks and files. The communication network 520 may be a LAN or both a SAN and a LAN.

The storage apparatus 100 includes a controller 110 and a storage device group 120. The controller 110 includes a memory 130, a microprocessor (MP) 140, a host interface (I/F) 150, a device I/F 160, a management I/F 170, and a battery 180. The storage device group 120 includes a storage device 190a configured to provide Tier1 (hereinafter abbreviated as T1), a storage device 190b configured to provide Tier2 (hereinafter abbreviated as T2), and a storage device 190c configured to provide Tier3 (hereinafter abbreviated as T3). For example, the storage devices 190a, 190b, and 190c are a solid state disk (SSD), a serial attached small computer system interface (SAS)-HDD, and a serial advanced technology attachment (SATA)-HDD, respectively. The SATA-HDD included in the storage apparatus 100 is an HDD for enterprises, which is expensive but high in reliability. The storage devices 190a, 190b, and 190c are hereinafter sometimes referred to as storage device 190 without being distinguished. In the present embodiment, Tier1 is configured by a plurality of SSDs, Tier2 is configured by a plurality of SAS-HDDs, and Tier3 is configured by a plurality of SATA-HDDs. The memory 130 stores therein programs and data for controlling the storage apparatus 100. The MP 140 is coupled to the memory 130, and controls the storage apparatus 100 in accordance with the programs stored in the memory 130. The host I/F 150 is coupled to the MP 140 and the communication network 510. The device I/F 160 is coupled to the MP 140, the storage device group 120, and the communication network 520. The management I/F 170 is coupled to the MP 140 and the communication network 530. The battery 180 supplies power to the controller 110 when commercial power is not supplied to the controller 110. The number of Tiers may be two or three or more.

The storage apparatus 200 includes a controller 210 and a storage device group 220. The controller 210 includes a memory 230, a microprocessor 240, a higher-level I/F 250, a device I/F 260, a management I/F 270, and an EC processing device 280. The storage device group 220 includes a plurality of storage devices 290. The storage devices 290 are SATA-HDDs for consumers. Consumer SATA-HDDs are more inexpensive than enterprise SAS-HDDs and SATA-HDDs, but are lower in reliability. The memory 230 stores therein programs and data for controlling the storage apparatus 200. The microprocessor 240 is coupled to the memory 230, and controls the storage apparatus 200 in accordance with the programs stored in the memory 230. The higher-level I/F 250 is coupled to the MP 240 and the communication network 520. The device I/F 260 is coupled to the MP 240 and the storage device group 220. The management I/F 270 is coupled to the MP 240 and the communication network 530. The EC processing device 280 performs EC processing on data written from the storage apparatus 100, and performs reverse EC processing on data read to the storage apparatus 100 for restoring of the data. The function of the EC processing device 280 may be stored in the memory 230 as a program, and may be executed by the microprocessor 240 in accordance with the program.

The failure rate of the storage device 290 when used at a predetermined I/O frequency is higher than the failure rate of the storage device 190 when used at the same I/O frequency. Correspondingly to the above-mentioned T1 to T3, a storage area based on the storage device group 220 is referred to as Tier4 and abbreviated as T4. The storage device 290 is inexpensive, and a large-capacity storage apparatus 200 can thus be implemented at low cost.

FIG. 2 illustrates contents of the memory 130 in the storage apparatus 100 and contents of the memory 230 in the storage apparatus 200.

The memory 130 in the storage apparatus 100 includes a meta data area 131 and a cache area 132. The meta data area 131 stores therein an automated tiering program 610, a virtual volume management table 710, a pool management table 720, an internal storage device management table 780, an external storage device management table 790, and a migration page count management table 740.

The memory 230 in the storage apparatus 200 stores therein a control program 810 and a lower-level page management table 910.

When the control program 810 receives a lower-level Write request from the storage apparatus 100, the control program 810 uses the EC processing device 280 to make data from the storage apparatus 100 redundant, and writes the redundant data into the plurality of storage devices 290. When the control program 810 receives a lower-level Read request from the storage apparatus 100, the control program 810 uses the EC processing device 280 to restore the data stored in the plurality of storage devices 290, and transmits the restored data to the storage apparatus 100. Other data are described later.

The outline of internal tier migration processing and lower-level Write processing performed by the storage apparatus 100 is described below.

The automated tiering program 610 provides a virtual volume to the host computer 400, and manages the virtual volume with dividing the virtual volume into virtual pages of predetermined page sizes for management. The page size is, for example, 42 MB. The automated tiering program 610 further creates a logical volume (sub logical unit: SLU) in the storage apparatus 100, allocates the logical volume provided by the storage apparatus 200 to the SLU, registers the SLU in a pool, and manages the SLU with dividing the SLU into logical pages (hereinafter referred to as real page) of predetermined sizes for management. A storage area of another predetermined size than the page, such as a unit, may be used.

The automated tiering program 610 performs every determination time set in advance internal tier migration processing involving measuring an I/O frequency for the real page, migrating data stored in the real page among T1, T2, and T3 on the basis of the I/O frequency, and changing a real page allocated to a virtual page to a real page at the migration destination.

After the internal tier migration processing, the automated tiering program 610 performs lower-level Write processing for migrating data stored in a real page satisfying a predetermined migration condition among real pages in T3 to T4.

Figure 3:
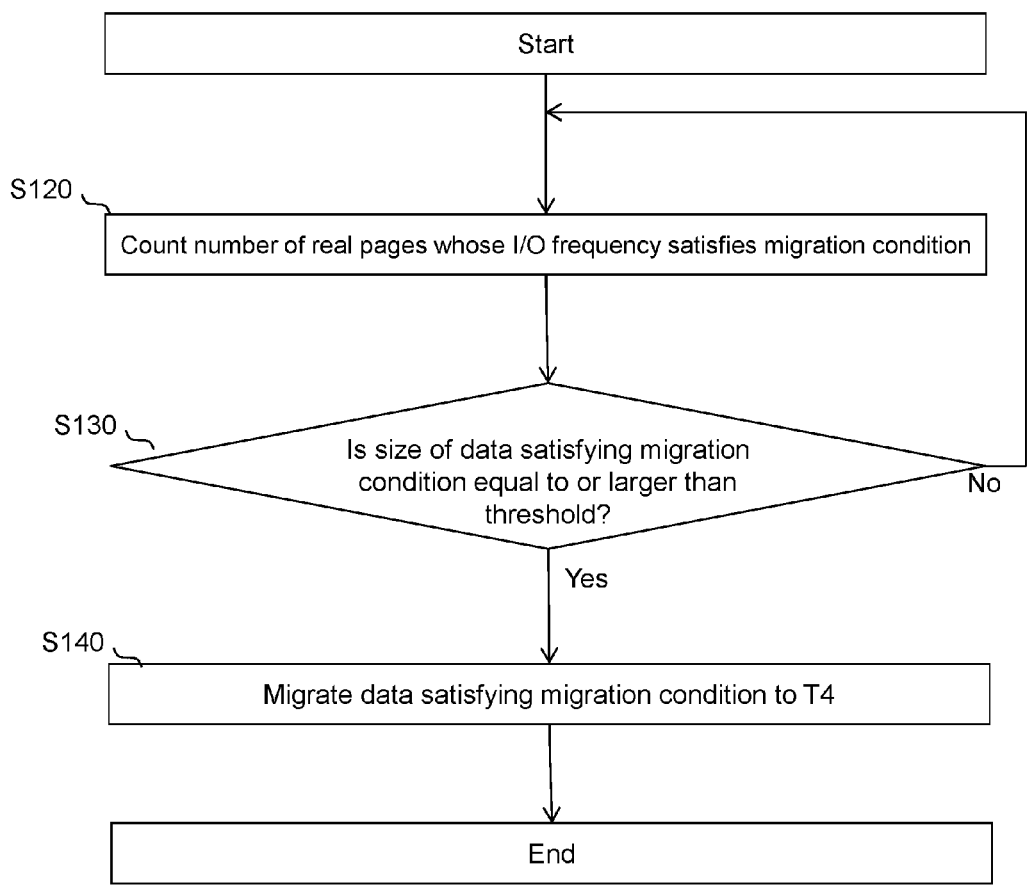
FIG. 3 illustrates the outline of lower-level Write processing by the storage system.

FIG. 3 illustrates the outline of the lower-level Write processing performed by the storage apparatus 100.

It is assumed that a real page in T3 has been allocated to a certain virtual page by the above-mentioned internal tier migration processing.

In S120, the controller 110 determines whether or not each of a plurality of real pages satisfies a migration condition periodically (for example, once a day), and specifies real pages that satisfy the migration condition. Then, the controller 110 counts the number of real pages whose I/O frequency satisfies the migration condition. Examples of the migration condition include the condition whether or not data stored in a real page remains in T3 continuously. For example, the migration condition is satisfied when data stored in a real page remains in T3 for a predetermined period or more. More specifically, the storage controller 110 may execute internal tier migration processing periodically to determine whether to migrate data stored in a real page between tiers in the storage apparatus 100, and the migration condition may be satisfied when it is determined by the determination by the internal tier migration processing that data stored in a certain real page does not need to be migrated from T3 continuously by predetermined times or more.

After that, in S130, the controller 110 determines whether or not the total size of data satisfying the migration condition is equal to or larger than a size threshold set in advance. More specifically, the controller 110 determines whether or not the counted number of real pages is equal to or larger than a page count threshold set in advance. When it is determined that the counted real page count exceeds the page count threshold (S130: Yes), in S140, the controller 110 migrates data stored in a real page group whose I/O frequency is determined to satisfy the condition collectively to the storage apparatus 200.

When it is determined that the counted real page count is smaller than the page count threshold (S130: No), the controller 110 stands by without migrating the data to the storage apparatus 200 (consumer storage). Then, the determination in S120 is performed again.

After that, the controller 210 in the storage apparatus 200 (consumer storage) performs EC processing on the data received from the storage apparatus 100, and writes the EC-processed data into the storage device 290.

This lower-level Write processing enables the storage apparatus 100 to migrate, after a predetermined volume of real pages satisfying the migration condition is accumulated, data stored in the real pages collectively to T4. Consequently, without directly controlling an access to the storage devices 290 in the storage apparatus 200, the storage apparatus 100 can control each storage device 290 to perform sequential writing, thereby reducing the I/O count and the operation of a magnetic head in each storage device 290 and reducing a failure of the storage device 290. Thus, the storage apparatus 200 can be effectively used, and the I/O frequency to the storage device 290 in the storage apparatus 200 can be suppressed.

The EC processing performed by the storage apparatus 200 is described below.

Figure 4:
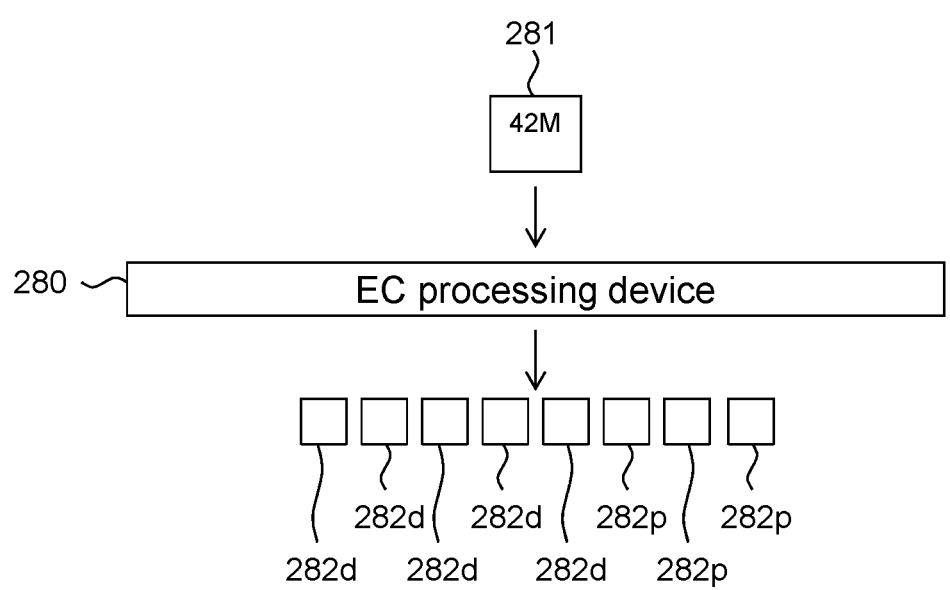
FIG. 4 illustrates EC processing.

FIG. 4 illustrates the EC processing.

When the EC processing device 280 in the storage apparatus 200 receives a lower-level Write request that requests data writing from the storage apparatus 100, the EC processing device 280 performs EC processing on the data received from the storage apparatus 100 in units of real pages. For example, the EC processing illustrated in FIG. 4 involves dividing a single pre-EC-processing page 281 to be provided to the storage apparatus 100 into predetermined chunk sizes to generate five data chunks 282d, generating three parity chunks 282p on the basis of the five data chunks 282d, and writing the eight chunks 282 into eight different storage devices 290, respectively. The chunk size is smaller than the page size, and is, for example, several hundred kB to several MB. FIG. 4 illustrates an example where the number of pages is one, but when the storage apparatus 200 receives data of a plurality of pages collectively, the EC processing device 280 performs EC processing on a page basis.

As understood from FIG. 4, when the EC processing is performed, the plurality of chunks whose sizes are smaller than the size of the page are written into different HDDs. Intermittent writing of such small chunks may increase the frequency of access to an HDD in the storage apparatus 200 and increase the fear of an HDD failure. In the present embodiment, the storage apparatus 100 transmits data of a plurality of pages collectively to the storage apparatus 200, and hence the number of pages that can be subjected to EC processing by the storage apparatus 200 is increased. Consequently, the number of chunks to be written into an HDD at a time by the storage apparatus 200 can be increased. Thus, the storage apparatus 200 can more easily write data into an HDD in a sequential manner, thereby reducing the frequency of access and reducing the occurrence of a failure.

When the controller 210 in the storage apparatus 200 receives a lower-level Read request that requests data reading from the storage apparatus 100, the controller 210 reads eight chunks 282 corresponding to a designated pre-EC-processing page 281. When any one of data in the eight chunks 282 has lost, the controller 210 restores data on the pre-EC-processing page 281 on the basis of chunks other than the lost chunk among the eight chunks 282, and transmits the restored data to the storage apparatus 100.

Figure 5:
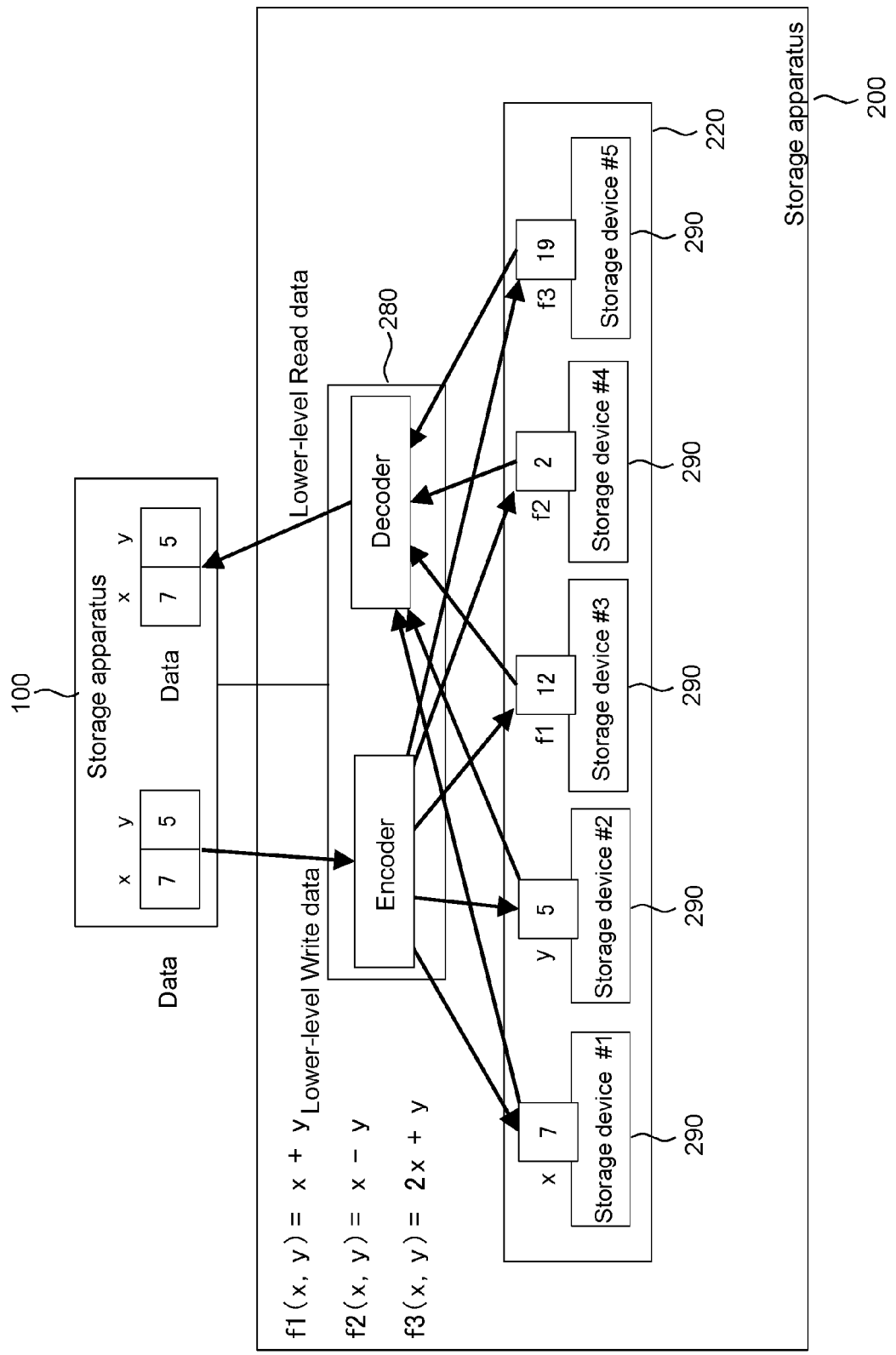
FIG. 5 illustrates a parity generation method in the EC processing.

FIG. 5 illustrates a parity generation method in the EC processing.

The EC processing device 280 in the storage apparatus 200 includes an encoder and a decoder for EC processing. The equations, the number of data chunk, and the number of parity chunks in the parity generation method are not limited to this example. The following example is to divide data of one real page into two chunks and generate three parity chunks.

When the storage apparatus 200 receives a lower-level Write request that requests data writing from the storage apparatus 100, the encoder divides lower-level Write data into x and y, and uses functions (conversions) set in advance to calculate parities $f1(x,y)$, $f2(x,y)$, and $f3(x,y)$ on the basis of the data x and y. After that, the encoder writes x, y, $f1(x,y)$, $f2(x,y)$, and $f3(x,y)$ into five different storage devices 290, respectively.

When the storage apparatus 200 receives a lower-level Read request that requests data reading from the storage apparatus 100, the decoder reads x and y from two storage devices 290, respectively. When the read x and y have no missing, the decoder transmits the read data to the storage apparatus 100. When any one of the read x and y has a missing, the decoder reads $f1(x,y)$, $f2(x,y)$, and $f3(x,y)$ from the other three storage devices 290, respectively, uses inverse functions (inverse conversions) that are set in advance to restore x and y from $f1(x,y)$, $f2(x,y)$, and $f3(x,y)$, and transmits the restored data to the storage apparatus 100.

With this EC processing, even when the failure rate of the storage device 290 in the storage apparatus 200 is higher than the failure rate of the storage device 190 in the storage apparatus 100, data damaged by a failure of the storage device 290 can be restored, and hence the cost of the storage device 290 can be reduced and the reliability of the storage apparatus 200 can be enhanced. The storage apparatus 200 may use a RAID instead of the EC processing.

Data stored in the storage apparatus 100 are described below.

FIG. 6 illustrates the virtual volume management table 710.

The virtual volume management table 710 has an entry for each virtual volume. A virtual volume number (#) 711 (logical unit number: LUN) is a number uniquely identifying a plurality of virtual volumes in the storage apparatus 100. A logical address space in one virtual volume is partitioned for each predetermined size, and each partitioned space is referred to as virtual page. An LBA 712 represents an address range of the virtual page. The LBA 712 may represent the first address of the virtual page. The virtual page number 713 is an identifier uniquely identifying a virtual page in the virtual volume. The allocated real page number 714 is an identifier representing a real page allocated to the virtual page. When no real page is allocated to the virtual page, the allocated real page number 714 represents unallocated.

The host computer 400 uses an I/O request to designate a virtual volume number and a logical block address (LBA) in the virtual volume, thereby accessing the virtual volume. The controller 110 uses the virtual volume management table 710 to specify a virtual page corresponding to the virtual volume and the LBA designated by the I/O request, a real page allocated to the virtual page, and the like.

FIG. 7 illustrates the pool management table 720.

The pool management table 720 includes an entry for each pool in the storage apparatus 100. An entry corresponding to one real page includes a pool number (#) 721, an SLU number (#) 722, a Tier number (#) 723, a type 724, a real page number (#) 725, a pool address 726, an allocation state 727, a Write count 728, a Read count 729, a previous storage Tier 730, and a T3 sojourn count 731. The pool number 721 is an identifier uniquely identifying a pool in the storage apparatus 100. The SLU number 722 is an identifier representing an SLU serving as a logical volume. The Tier number 723 is an identifier representing a Tier to which the SLU belongs. The type 724 represents whether the SLU is an SLU based on a storage device inside the storage apparatus 100 or an SLU based on a storage device outside the storage apparatus 100 (in the present embodiment, the storage apparatus 200). The real page number 725 is an identifier identifying a real page in the SLU. The pool address 726 is a first address of each real page in the SLU. The allocation state 727 represents whether or not the real page is allocated to a virtual page. The Write count 728 is the count of writing to the real page in a period from previous internal tier migration processing to the current time. The Read count 729 is the count of reading to the real page in the period from the previous internal tier migration processing to the current time. The previous storage Tier 730 is an identifier representing a real page Tier in which data stored in the real page was stored before previous internal tier migration processing. The T3 sojourn count 731 is a count α by which the I/O frequency for the real page is continuously determined to be in a predetermined acceptable range of the I/O frequency for T3 by internal tier migration processing. In other words, the T3 sojourn count 731 represents that the real page belonging to T3 is allocated to the same virtual page over previous a times of continuous internal tier migration processing.

The controller 110 uses the pool management table 720 to specify an SLU, a Tier, and the like corresponding to a real page.

Figure 8:
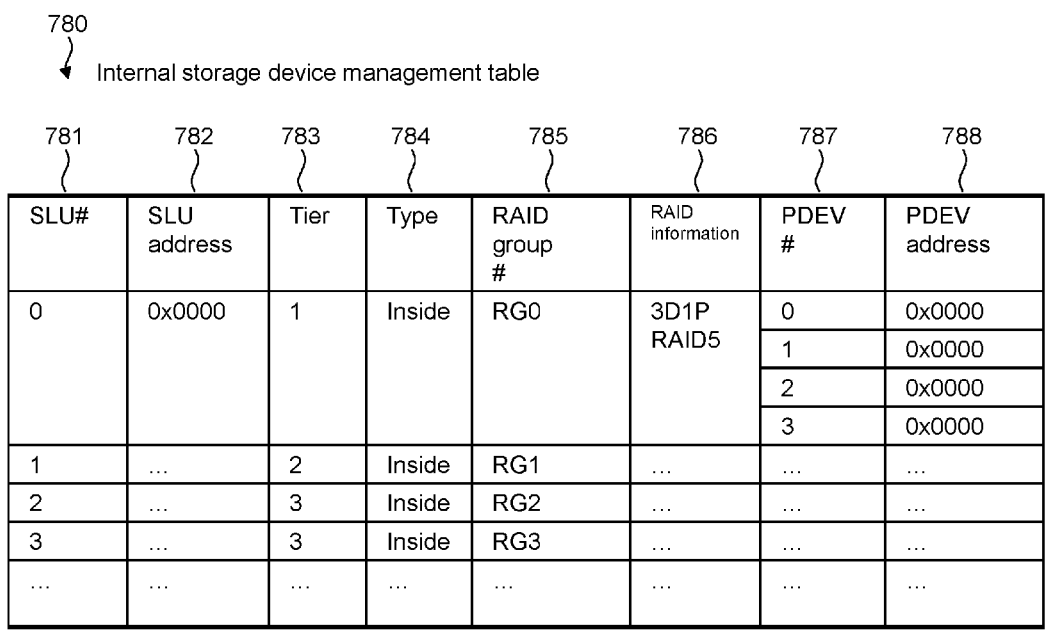
FIG. 8 illustrates an internal storage device management table 780.

FIG. 8 illustrates the internal storage device management table 780.

The controller 110 uses a plurality of storage devices 190 in the storage apparatus 100 to create a RAID group for each Tier, and uses a part or whole of the RAID group to create an SLU and manages the SLU with dividing the SLU into a plurality of real pages.

The internal storage device management table 780 manages the storage devices 190 inside the storage apparatus 100. The internal storage device management table 780 has an entry for each SLU inside the storage apparatus 100. An entry corresponding to one SLU includes an SLU number (#) 781, an SLU address 782, a Tier 783, a type 784, a redundant arrays of inexpensive disks (RAID) group number (#) 785, RAID information 786, a physical device (PDEV) number (#) 787, and a PDEV address 788. The SLU number 781 is an identifier representing the SLU. The SLU address 782 represents an address range allocated to a RAID group in the SLU. The Tier 783 is a Tier to which the SLU belongs. The type 784 represents whether the SLU is inside or outside the storage apparatus 100. The value of the type 784 in this case represents inside. The RAID group number 785 is an identifier representing a RAID group allocated to the SLU. The RAID information 786 represents a RAID level, the number of data disks, the number of parity disks, and the like as the configuration of the RAID group. The PDEV number 787 is an identifier representing a storage device 190 allocated to the RAID group. The PDEV address 788 represents an address range allocated to the RAID group in the storage device 190.

The controller 110 uses the internal storage device management table 780 to specify a storage device 190 and an address range on the storage device 190 corresponding to an SLU.

FIG. 9 illustrates the external storage device management table 790.

The controller 210 in the storage apparatus 200 uses the plurality of storage devices 290 in the storage apparatus 200 to create an EC group for EC processing, and uses a part or whole of the EC group to create a T4 LU, which is an LU to be provided to the storage apparatus 100. The controller 110 in the storage apparatus 100 allocates the T4 LU to an SLU in the storage apparatus 100 for management, and manages the T4 LU with dividing the T4 LU into a plurality of real pages (external logical pages).

The external storage device management table 790 manages the storage devices 290 outside the storage apparatus 100. The external storage device management table 790 has an entry for each SLU outside the storage apparatus 100. An entry corresponding to one SLU includes an SLU number (#) 791, an SLU address 792, a Tier 793, a type 794, an erasure coding (EC) group number (#) 795, a T4 apparatus number (#) 796, a T4 LU number (#) 797, and a T4 LU address 798. The SLU number 791 is an identifier representing the SLU. The SLU address 792 represents an address range allocated to the EC group in the SLU. The Tier 793 is a Tier to which the SLU belongs. The type 794 represents whether the SLU is inside or outside the storage apparatus 100. The value of the type 794 represents outside. The EC group number 795 is an identifier representing the EC group allocated to the SLU. The T4 apparatus number 796 represents the storage apparatus 200 allocated to the SLU. The T4 apparatus number 796 in this case represents the storage apparatus 200. The T4 LU number 797 is an identifier representing a T4 LU corresponding to the SLU. The T4 LU address 798 represents an address range allocated to the EC group in the T4 LU.

The controller 110 uses the external storage device management table 790 to specify a storage device 290 and an address range on the storage device 290 corresponding to the SLU.

Figure 10:
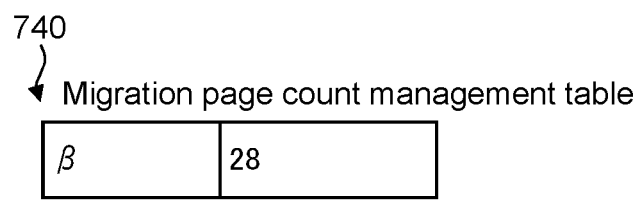
FIG. 10 illustrates a migration page count management table 740.

FIG. 10 illustrates the migration page count management table 740.

The migration page count management table 740 represents a migration page count β, which is the number of real pages whose data is determined to be migrated from T3 to T4 among real pages in the virtual volume management table 710.

Setting processing by the management computer 300 is described below.

The management computer 300 includes a memory, a microprocessor, a display device, and an input device. The memory stores therein programs and data for managing the storage system. The microprocessor follows the program stored in the memory to execute the management of the storage system. The display device displays a screen instructed by the microprocessor. The input device inputs an operation by the administrator to the microprocessor. In response to the operation by the administrator, the management computer 300 displays a GUI screen for inputting setting values.

FIG. 11 illustrates the GUI screen.

The setting values set via the GUI screen are a T3 sojourn count threshold as a threshold of the T3 sojourn count α, a migration page count threshold as a threshold of the migration page count β, and a Read count threshold as a threshold of the Read count. The GUI screen includes an item name display portion 761 and an input portion 762 for each setting value. When setting values are input to the input portions 762 for the respective setting values via an operation of an administrator, the management computer 300 transmits the input setting values to the storage apparatus 100. The controller 110 in the storage apparatus 100 receives the setting values from the management computer 300, and stores the setting values in the memory 130.

An appropriate migration page count threshold may be set in the storage apparatus 100 in advance. For example, the management computer 300 calculates the migration page count threshold under the condition that an access to each storage device 290 by lower-level Write processing is a sequential access. Data stored in one real page in the storage apparatus 100 is transmitted to the storage apparatus 200, and the data is subjected to EC processing, so that data of L bytes is written into each of a plurality of storage devices 290. Each storage device 290 writes data of N×L bytes or more by sequential writing. Specifically, the storage apparatus 100 migrates data of N pages or more to the storage apparatus 200 by single lower-level Write processing, and the controller 210 in the storage apparatus 200 can perform sequential writing in each storage device 290. N×L bytes may be, for example, the minimum track size or average track size in an HDD of the storage device 290, or may be a size of a predetermined number of blocks. The management computer 300 may display N as an initial value of the migration page count threshold on the GUI screen. The GUI screen may include an automatic setting button, and the management computer 300 may set N to the migration page count threshold in response to the operation on the automatic setting button. Examples of the above-mentioned page count threshold include a migration page count threshold. Examples of the above-mentioned size threshold include migration page count threshold×page size.

The operation of the storage system is described below.

Figure 12:
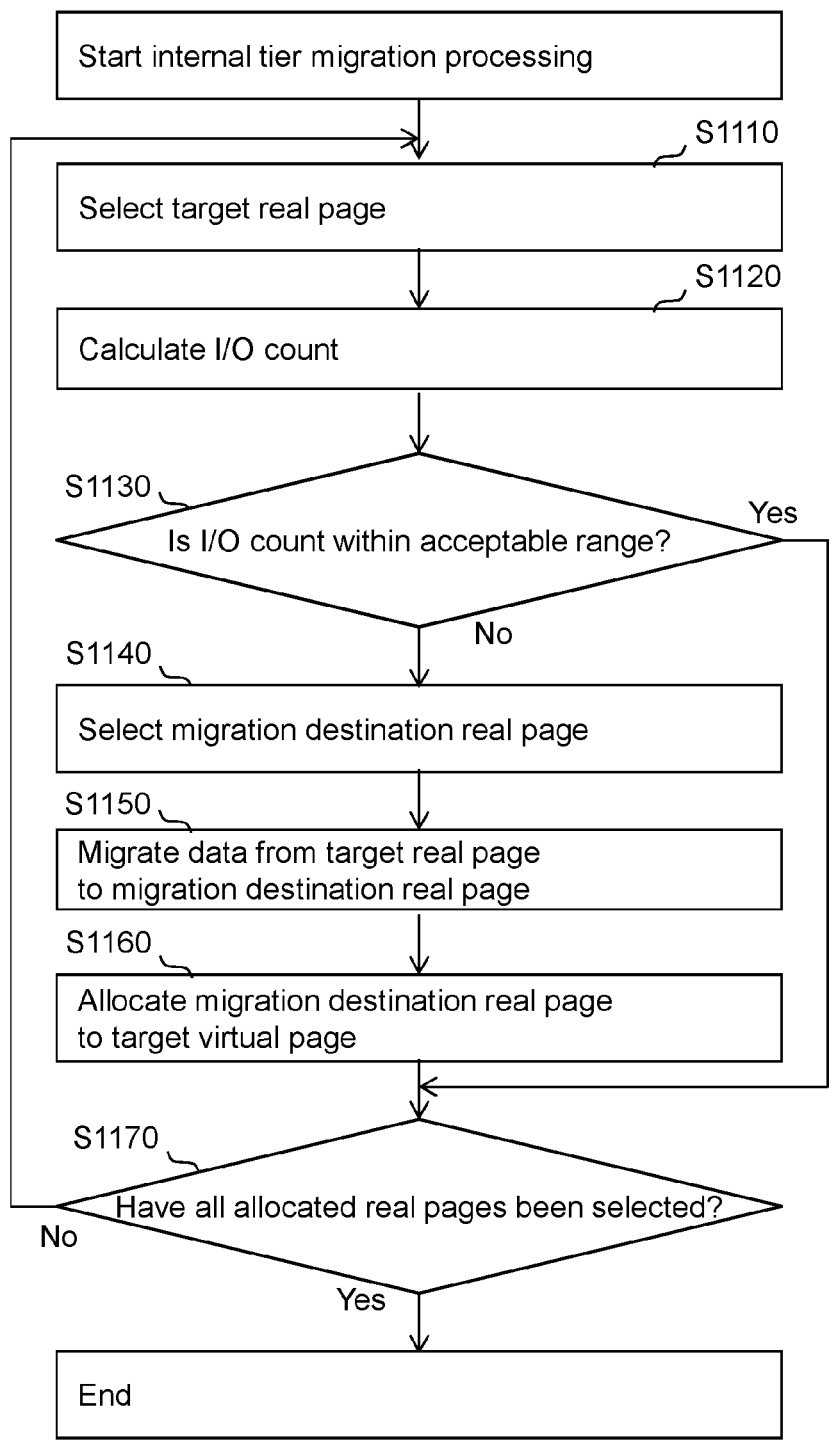
FIG. 12 illustrates internal tier migration processing.

FIG. 12 illustrates internal tier migration processing.

An acceptable range of the I/O count for a real page in a determination time is set for each of T1, T2, and T3 by the management computer 300 in advance, and stored in the memory 130 in the storage apparatus 100. The tier number (T1, T2) represents the tier order. Specifically, a smaller tier number represents that the tier is a higher level. A higher-level tier has higher performance of a storage device for the tier. The internal tier migration processing involves arranging data in a higher-level tier as the I/O count for a real page storing data becomes higher. Thus, the acceptable range for T1 is higher than the acceptable range for T2. The acceptable range for T2 is higher than the acceptable range for T3.

In S1110, the controller 110 searches for allocated real pages (real pages whose allocation state 727 is "allocated") among real pages in the pool management table 720, and sequentially selects the allocated real page as target real page. A tier to which the target real page belongs is referred to as target tier.

After that, in S1120, the controller 110 sums a Write count 728 and a Read count 729 for the target real page in the pool management table 720 to calculate an I/O count for the target real page. The I/O frequency may be either of the I/O count in a determination time or the I/O data volume in the determination time. After that, in S1130, the controller 110 determines whether or not the I/O count for the target real page is within the acceptable range. When it is determined that the I/O count for the target real page is within the acceptable range for the target tier (Yes), the controller 110 proceeds to S1140 to perform processing on the next target real page. When it is determined that the I/O count for the target real page is outside the acceptable range (No), the controller 110 selects, on the basis of the I/O count for the target real page, a migration destination tier from among a plurality of tiers, and selects an unallocated real page (real page whose allocation state 727 is "unallocated") belonging to the migration destination tier from the pool management table 720 as a migration destination real page. When the I/O count for the target real page exceeds the acceptable range, the controller 110 selects the next higher tier than the target tier as a migration destination tier. When the I/O count for the target real page falls below the acceptable range, the controller 110 selects the next lower tier than the target tier as a migration destination tier.

After that, in S1130, the controller 110 migrates data stored in the target real page to the migration destination real page. The controller 110 accesses each of the target real page and the migration destination real page by using the internal storage device management table 780 and specifying a RAID group and a storage device 190. After that, the controller 110 changes the real page allocated to the target virtual page from the target real page to the migration destination real page in the virtual volume management table 710, and changes the allocation state of the migration destination real page to allocated and the allocation state of the target real page to unallocated in the pool management table 720. The controller 110 further stores the value of a Tier 723 of the target real page in the previous storage Tier 730 of the target real page in the pool management table 720.

After that, in S1140, the controller 110 determines whether or not all the real pages have been selected as target real pages. When it is determined that all of the real pages have not been selected yet (No), the controller 110 proceeds to S1110 to select the next real page. In contrast, when it is determined that all the real pages have been selected (Yes), the controller 110 finishes this flow.

The internal tier migration processing described above enables the storage apparatus 100 to arrange data stored in a real page to any one of T1, T2, and T3 appropriately in accordance with the I/O count for the real page. Specifically, data with a large I/O count is stored in T1 configured by a high-performance storage device, and data with a small I/O count is stored in T3 configured by a low-performance storage device.

Details of the above-mentioned lower-level Write processing are now described.

Figure 13:
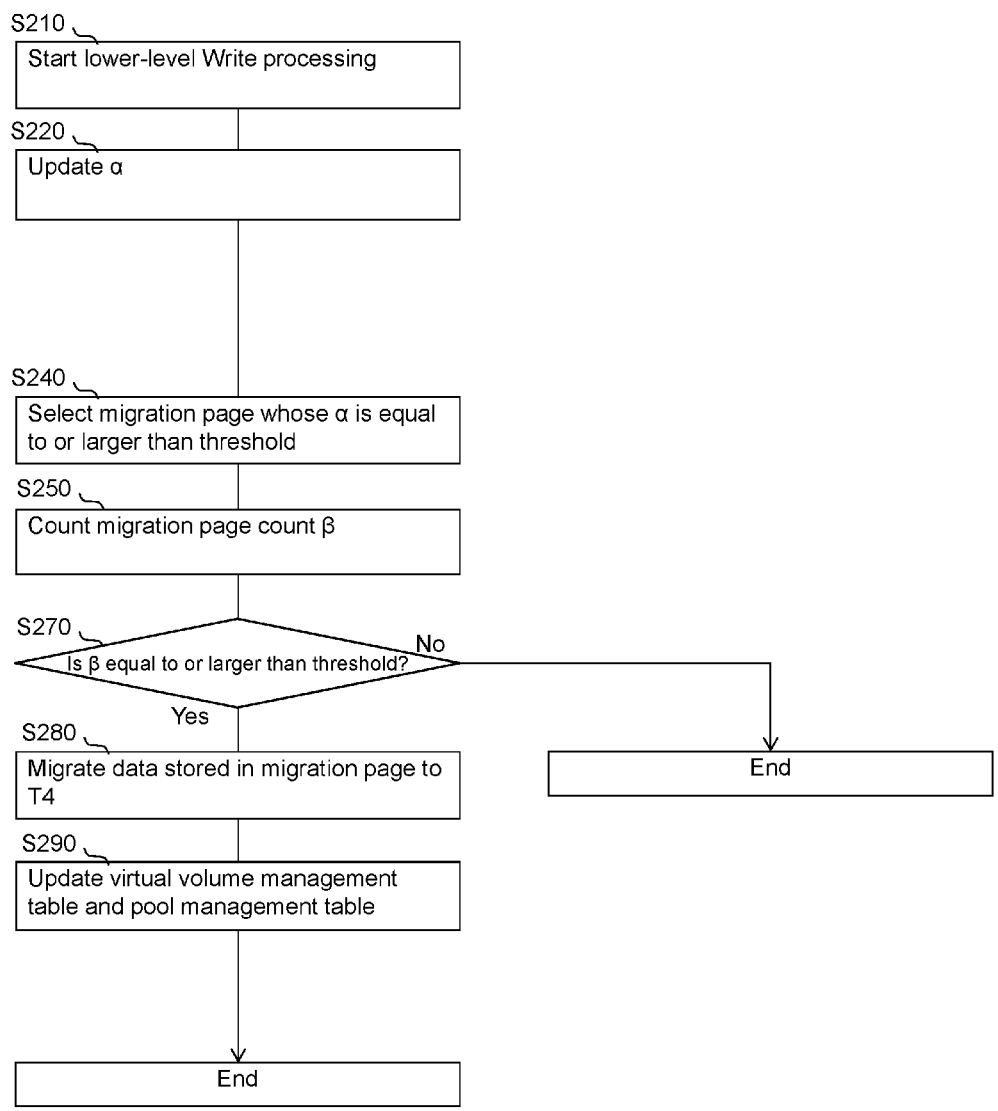
FIG. 13 illustrates lower-level Write processing.

FIG. 13 illustrates the lower-level Write processing.

After the internal tier migration processing, in S210, the controller 110 in the storage apparatus 100 starts the lower-level Write processing. The controller 110 may start the lower-level Write processing in response to an instruction from the management computer 300 based on an operation by the administrator.

In S220, the controller 110 sequentially selects allocated real pages in the pool management table 720 as target real pages. When a previous storage Tier 730 of the target real page in the pool management table 720 is T3 and when a Tier 723 of the target real page in the pool management table 720 is T3, the controller 110 adds 1 to $\alpha$ of a T3 sojourn count 731 and otherwise stores 0 in $\alpha$ of the T3 sojourn count 731.

In S240, the controller 110 compares a corresponding to each allocated real page with a T3 sojourn count threshold, and selects an allocated real page whose a is equal to or larger than the T3 sojourn count threshold as a migration page. This configuration enables the controller 110 to detect a real page where data having sojourned in T3 for a predetermined period or more from the real pages as a migration page. Instead of using the T3 sojourn count $\alpha$, the controller 110 may measure a time during which data stored in a real page is continuously arranged in T3 as a sojourn time, and the controller 110 may detect a real page whose sojourn time is equal to or larger than a predetermined sojourn time threshold as a migration page. Consequently, the controller 110 can detect a real page having a smaller I/O count among real pages in T3. The predetermined period and the sojourn time threshold are, for example, a period over internal tier migration processing that is continued for the count of the T3 sojourn count threshold.

In S250, the controller 110 counts a migration page count $\beta$, and stores the calculated $\beta$ in the migration page count management table 740.

In S270, the controller 110 determines whether or not $\beta$ is equal to or larger than a migration page count threshold set in advance. When $\beta$ is determined to be smaller than the migration page count threshold (No), the controller 110 finishes this flow. When $\beta$ is determined to be equal to or larger than the migration page count threshold (Yes), in S280, the controller 110 migrates data stored in a plurality of migration pages (migration source logical pages) satisfying the condition to T4. The controller 110 selects unallocated real pages belonging to T4 as migration destination real pages (migration destination external logical pages) and issues to the storage apparatus 200, a lower-level Write request involving writing data stored in a plurality of migration pages into the storage apparatus 200, thereby moving the data stored in the plurality of migration pages to the migration destination real page. The controller 110 uses the external storage device management table 790 to specify a T4 apparatus number 796, a T4 LU number 797, and a T4 LU address 798 for the migration destination real page, and designates the specified T4 LU number and T4 LU address in the lower-level Write request. Consequently, when a predetermined volume or more of migration pages satisfying the condition has sojourned, the controller 110 can migrate data stored in the migration pages to T4. Instead of using the migration page count, the controller 110 may migrate data stored in migration pages to T4 when the total size of all migration pages is equal to or larger than a predetermined size threshold.

In S290, the controller 110 updates the virtual volume management table 710 and the pool management table 720, and finishes this flow. The controller 110 refers to the virtual volume management table 710 to specify a virtual page (specified virtual page) allocated with an allocated real page number 714 representing a migration page and change the allocated real page number 714 to the value of a real page number 725 of the migration destination real page in T4, and refers to the pool management table 720 to change an allocation state 727 of the migration destination real page in T4 to allocated and an allocation state 727 of the migration source real page in T3 to unallocated.

This lower-level Write processing enables the storage apparatus 100 to migrate data stored in a migration page from T3 to T4 on the basis of the result of the internal tier migration processing. The storage apparatus 100 migrates data stored in a predetermined volume of real pages satisfying the migration condition among allocated real pages in T3 collectively to T4, thereby suppressing the I/O frequency to the storage apparatus 200 as compared with the case where data is migrated in units of real pages. The collective migration of data stored in a predetermined volume of real pages from T3 to T4 by the storage apparatus 100 enables the storage apparatus 200 to sequentially access the storage device 290 to reduce the operation of a magnetic head of the storage device 290.

Write processing executed by the storage apparatus 100 in response to a Write request from the host computer 400 is now described.

Figure 14:
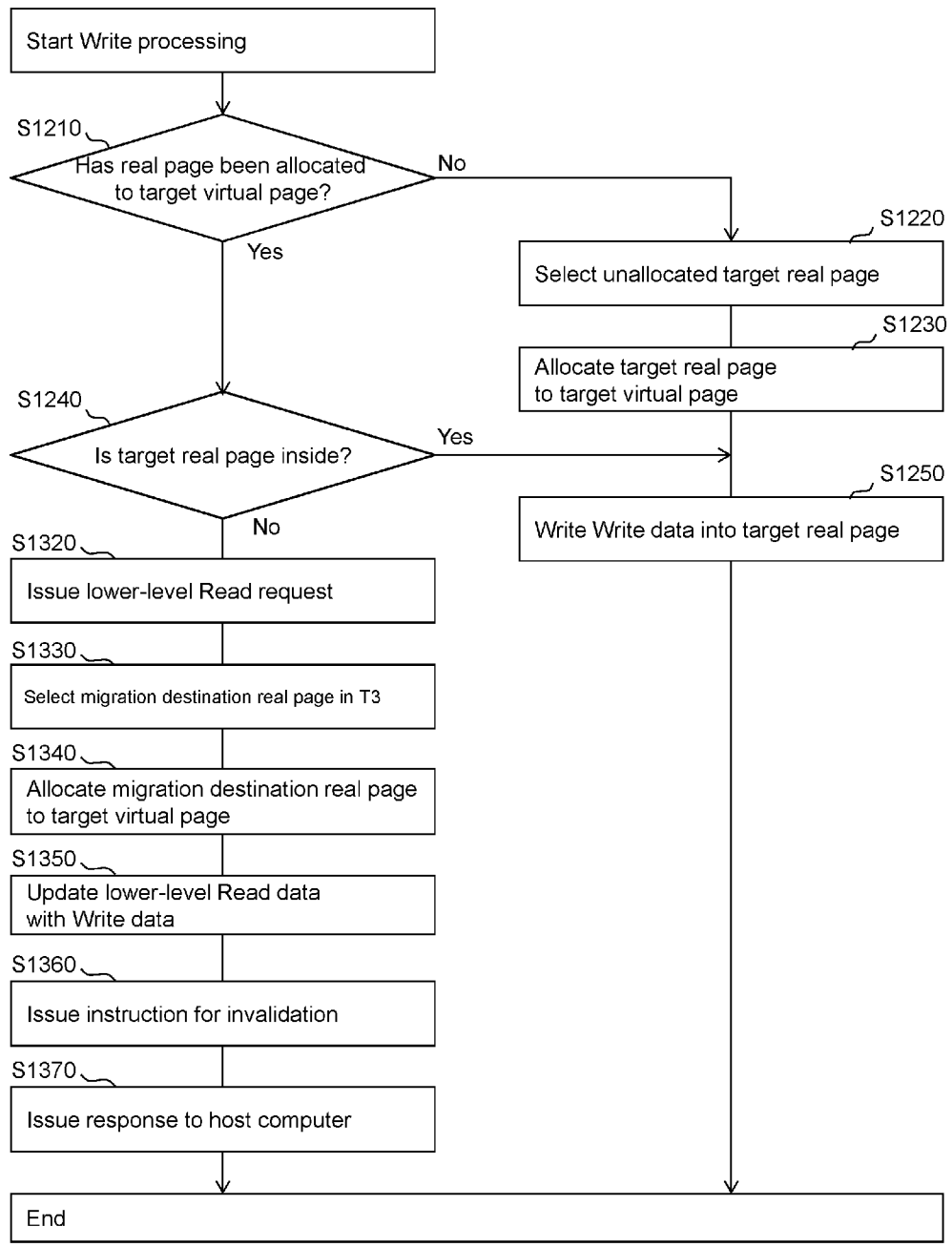
FIG. 14 illustrates Write processing.

FIG. 14 illustrates Write processing.

When the host computer 400 issues a Write request that designates a virtual volume number and an LBA (virtual address) to the storage apparatus 100, the controller 110 in the storage apparatus 100 starts the Write processing.

In S1210, on the basis of the virtual volume management table 710, the controller 110 specifies a target virtual page (first virtual page) by referring to a virtual page number 713 corresponding to a virtual volume number 711 and an LBA 712 designated by the Write request, and determines whether or not a real page is allocated to the target virtual page by referring to an allocated real page number 714.

When it is determined that a real page is not allocated to the target virtual page (No), in S1220, the controller 110 selects an unallocated real page belonging to a predetermined tier from the pool management table 720 as a target real page. After that, in S1230, the controller 110 allocates the target real page to the target virtual page in the virtual volume management table 710, and changes an allocation state 727 of the target real page to allocated in the pool management table 720. After that, in S1250, the controller 110 writes Write data received from the host computer 400 into the target real page. The predetermined tier is, for example, T1. The controller 110 specifies a RAID group number 785 corresponding to the target real page on the basis of the internal storage device management table 780, and writes the Write data into the specified RAID group.

When it is determined that a real page is allocated to the target virtual page (No), in S1240, the controller 110 uses the real page as a target real page to determine whether or not a type 724 of the target real page is inside (T1, T2, T3) of the storage apparatus 100 on the basis of the pool management table 720.

When it is determined that the type 724 of the target real page is inside of the storage apparatus 100 (Yes), the controller 110 proceeds to S1250.

When it is determined that the type 724 of the target real page is outside (T4) of the storage apparatus 100 (No), in S1320, the controller 110 specifies a T4 apparatus number 796, a T4 LU number 797, and a T4 LU address 798 corresponding to the target real page (first external logical page) on the basis of the external storage device management table 790, and issues, to the storage apparatus 200 corresponding to the specified T4 apparatus number, a lower-level Read request (first read instruction) to request the reading of data from the specified T4 apparatus, T4 LU, and T4 LU address.

In response to the lower-level Read request, the controller 210 in the storage apparatus 200 reads post-EC-processing data stored in an EC group corresponding to the target real page, restores data from the read post-EC-processing data through reverse EC processing, and transmits the restored data to the storage apparatus 100 as lower-level Read data. In response thereto, the controller 110 receives the lower-level Read data from the storage apparatus 200, and writes the lower-level Read data into the cache area 132.

In S1330, the controller 110 selects an unallocated real page in T3 from the pool management table 720 as a migration destination real page.

After that, in S1340, the controller 110 changes an allocated real page number 714 of the target virtual page from a real page number of the target real page to a real page number of the migration destination real page in the virtual volume management table 710, and changes an allocation state 727 of the migration destination real page to allocated and an allocation state 727 of the target real page to unallocated in the pool management table 720.

After that, in S1350, the controller 110 updates the data stored in the cache area 132 with Write data. On the basis of the internal storage device management table 780, the controller 110 further specifies a RAID group number 785, a PDEV number 787, and a PDEV address 788 in a storage area corresponding to the migration destination real page in the storage device 190c, and writes the data updated in the cache area 132 into the specified storage area.

After that, in S1360, the controller 110 transmits an instruction to invalidate the target real page to the storage apparatus 200. In response to the invalidation instruction, the controller 210 in the storage apparatus 200 can reflect the fact that the data stored in the target real page is unnecessary to the management table in the storage area in the storage apparatus 200, thereby overwriting data received from the storage apparatus 100 after the reflection into the target real page. Consequently, the number of I/O to the storage device 290 can be reduced.

After that, in S1370, the controller 110 transmits a response to the Write request to the host computer 400, and finishes this flow.

The Write processing described above enables the storage system to migrate, when a target real page in T4 is allocated to a target virtual page designated by a Write request from the host computer 400, data stored in the target real page to the storage apparatus 100, and update the data in the storage apparatus 100. Consequently, the number of I/O to the storage device 290 can be reduced as compared with the case where data stored in the storage device 290 is updated.

The order of the processing for writing updated data into the storage device 190c, S1360, and S1370 may be replaced.

Some examples of Read processing that is executed by the storage apparatus 100 in response to a Read request from the host computer 400 are now described.

Figure 15:
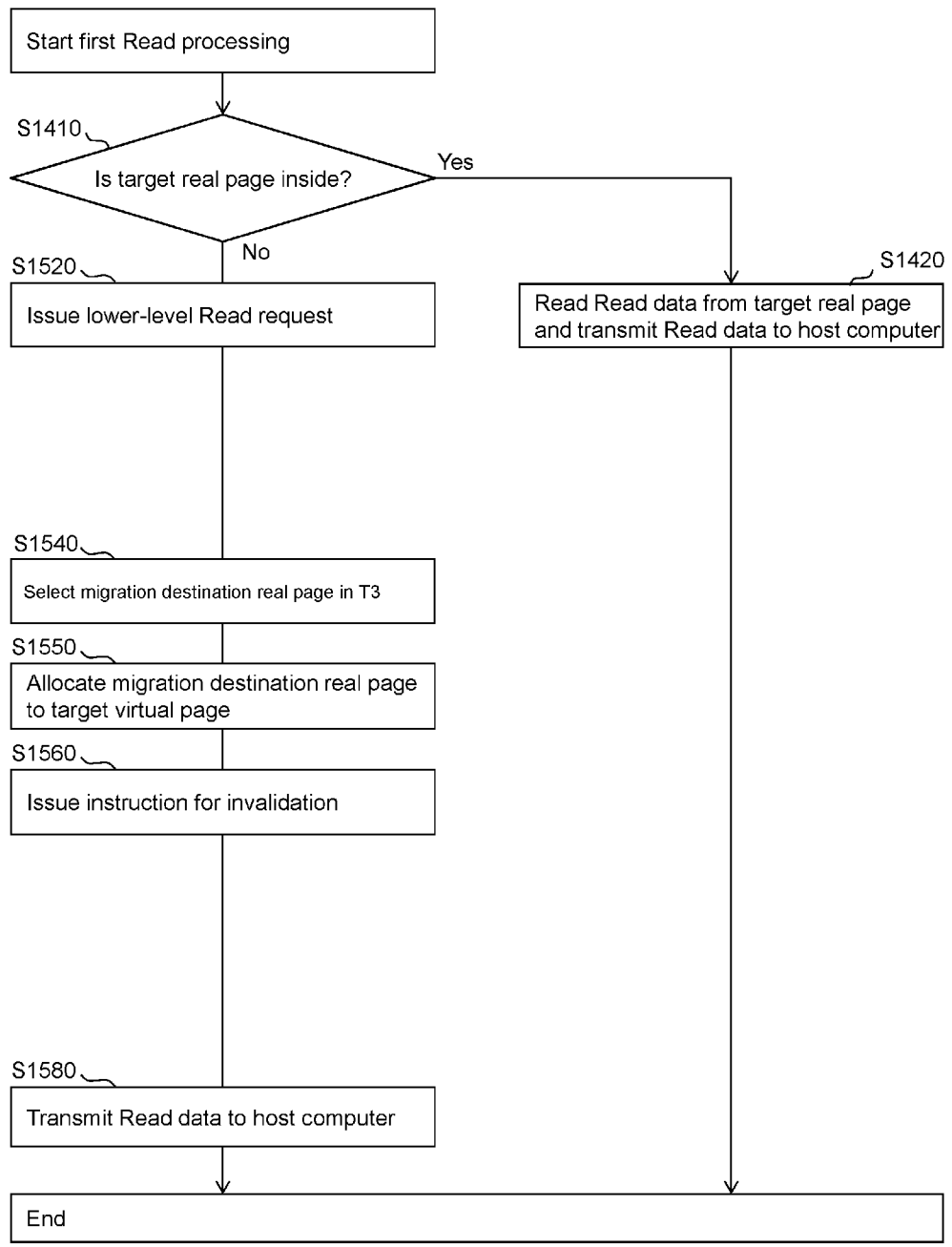
FIG. 15 illustrates first Read processing.

FIG. 15 illustrates first Read processing.

When the host computer 400 issues a Read request that designates a virtual volume number and an LBA to the storage apparatus 100, the controller 110 in the storage apparatus 100 starts the first Read processing.

In S1410, on the basis of the virtual volume management table 710, the controller 110 specifies a target virtual page (second virtual page) by referring to a virtual page number 713 corresponding to a virtual volume number 711 and an LBA 712 designated by the Read request, and specifies a real page allocated to the target virtual page as a target real page by referring to an allocated real page number 714, thereby determining whether or not the target real page is inside (T1, T2, T3) the storage apparatus 100 on the basis of a type 724 of the target real page in the pool management table 720.

When it is determined that the target real page is inside of the storage apparatus 100 (Yes), in S1420, the controller 110 reads Read data from the target real page, transmits the Read data to the host computer 400, and finishes this flow. The controller 110 specifies a RAID group number 785 corresponding to the target real page on the basis of the internal storage device management table 780, and reads the Read data from the specified RAID group.

When it is determined that the target real page is outside (T4) of the storage apparatus 100 (No), in S1520, the controller 110 specifies a T4 apparatus number 796, a T4 LU 797, and a T4 LU address 798 corresponding to the target real page (second external logical page) on the basis of the external storage device management table 790, and issues, to the storage apparatus 200 corresponding to the specified T4 apparatus number, a lower-level Read request (second read instruction) to request the reading of data from the specified T4 apparatus, T4 LU, and T4 LU address.

In response to the lower-level Read request, the controller 210 in the storage apparatus 200 reads post-EC-processing data stored in an EC group corresponding to the target real page, restores data from the read post-EC-processing data through reverse EC processing, and transmits the restored data to the storage apparatus 100 as Read data. In response thereto, the controller 110 receives the Read data from the storage apparatus 200, and writes the Read data into the cache area 132.

After that, in S1540, the controller 110 selects an unallocated real page in T3 from the pool management table 720 as a migration destination real page.

After that, in S1550, the controller 110 changes an allocated real page number 714 of the target virtual page from a real page number of the target real page to a real page number of the migration destination real page in the virtual volume management table 710, changes an allocation state 727 of the migration destination real page to allocated and an allocation state 727 of the target real page to unallocated in the pool management table 720. On the basis of the internal storage device management table 780, the controller 110 further specifies a RAID group number 785, a PDEV number 787, and a PDEV address 788 in a storage area corresponding to the migration destination real page in the storage device 190c, and writes the Read data in the cache area 132 into the specified storage area.

After that, in S1560, the controller 110 issues an instruction to invalidate the target real page to the storage apparatus 200.

After that, in S1580, the controller 110 transmits the Read data to the host computer 400, and finishes this flow.

The first Read processing described above enables the storage system to use the condition in which a Read request is generated for a real page in T4 as a remigration condition, and migrate, when the real page in T4 satisfies the remigration condition, data stored in the real page to T3, thereby immediately migrating the data stored in the real page from T4 to T3. Consequently, when the migrated data is frequently accessed, the number of I/O to the storage device 290 in the storage apparatus 200 can be reduced.

The order of the processing for writing Read data into the storage device 190c, S1560, and S1580 may be replaced.

Figure 16:
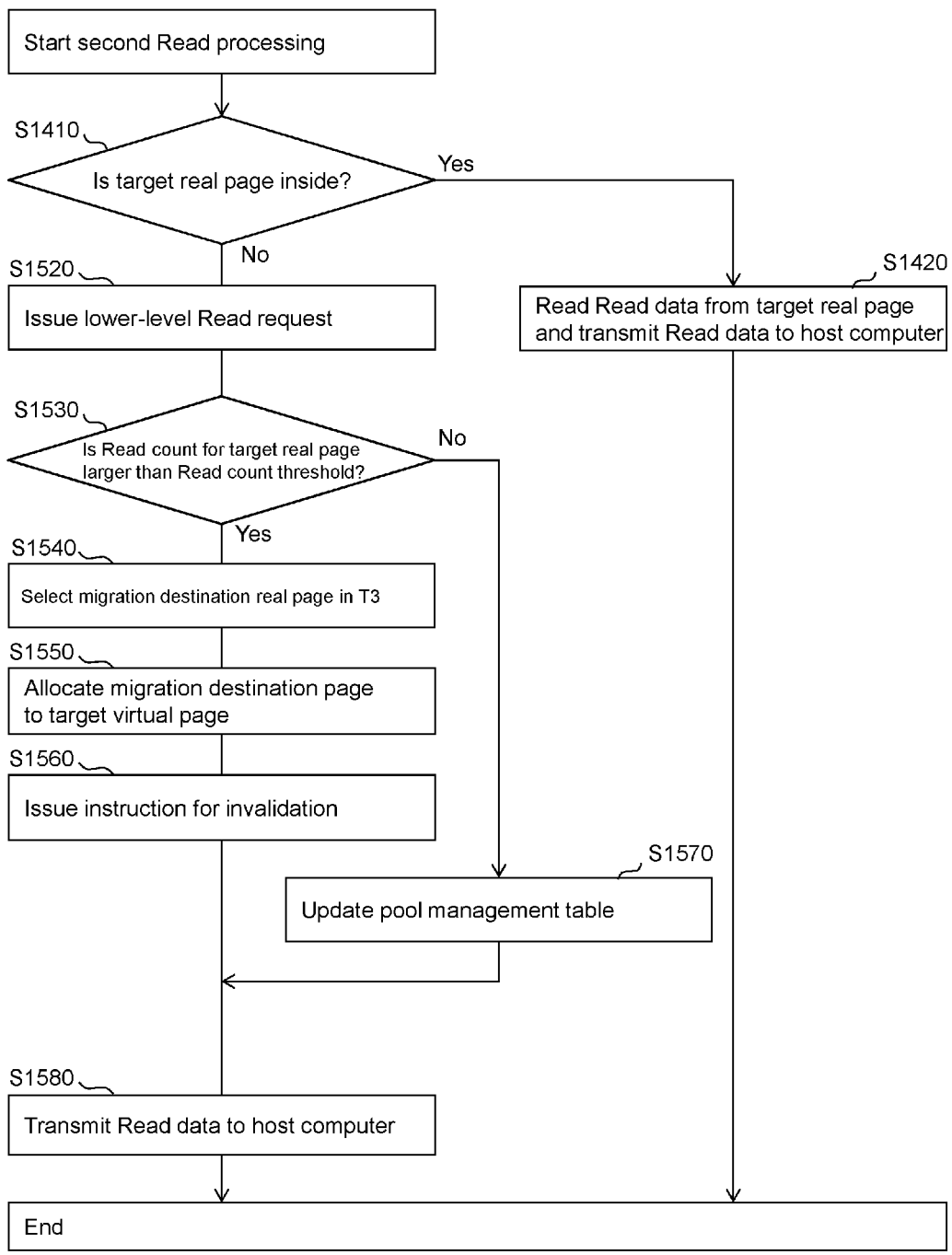
FIG. 16 illustrates second Read processing.

FIG. 16 illustrates second Read processing.

In the flow of the second Read processing, processing denoted by the same reference symbols as those in the processing in the flow of the first Read processing represents the same or corresponding processing.

In S1410, S1420, and S1520, the controller 110 performs identical or similar processing to that in the first Read processing.

In S1530, the controller 110 determines whether or not the Read count 729 for a target real page in the pool management table 720 exceeds a Read count threshold. When it is determined that the Read count 729 is equal to or smaller than the Read count threshold (No), in S1570, the controller 110 increments the Read count 729 for the target real page in the pool management table 720 by 1, and proceeds to S1580. In contrast, when it is determined that the Read count 729 exceeds the Read count threshold (Yes), the controller 110 proceeds to S1540.

In S1540, S1550, S1560, and S1580, the controller 110 performs processing identical or similar to that in the first Read processing.

The second Read processing described above enables the storage system to use the condition in which the Read count 729 for a real page in T4 exceeds a Read count threshold as a remigration condition, and immediately migrate, when the real page in T4 satisfies the remigration condition, data stored in the real page to T3 to prevent the data stored in the real page in T4 from being migrated from T4 to T3 until the real page satisfies the Read I/O condition. This configuration prevents the migrated data from being migrated from T3 to T4 again when no subsequent access is made to the migrated data, thereby reducing the number of I/O to the storage device 290 in the storage apparatus 200.

The case where the first Read processing is performed corresponds to the case where the Read count threshold in the second Read processing is 1.

The controller 110 may perform selection Read processing for selecting any one of the first Read processing and the second Read processing in response to a Read request from the host computer 400.

Figure 17:
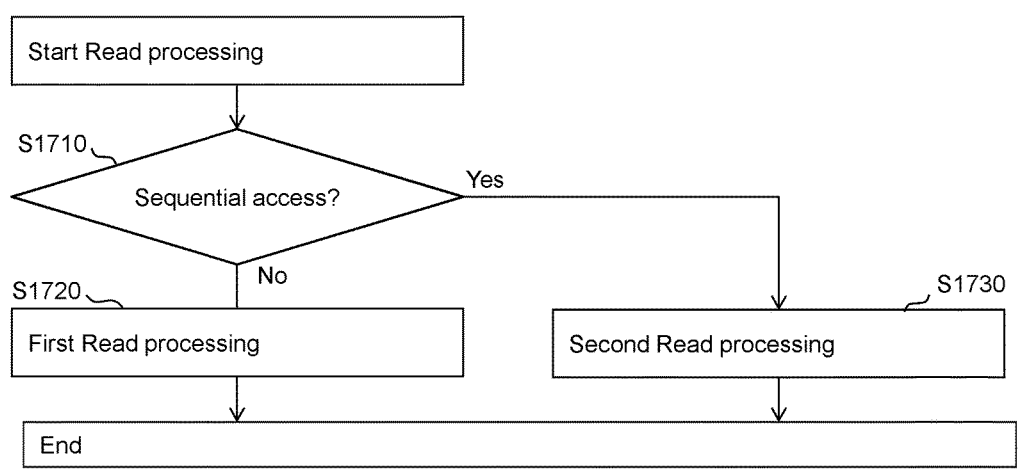
FIG. 17 illustrates selection Read processing.

FIG. 17 illustrates selection Read processing.

The controller 110 determines an access pattern for each virtual page on the basis of the data size designated by an I/O request from the host computer 400. The access pattern is, for example, any one of a sequential access and a random access.

When the host computer 400 issues a Read request that designates a virtual volume number and an LBA to the storage apparatus 100, the controller 110 in the storage apparatus 100 starts Read processing.

In S1710, on the basis of the virtual volume management table 710, the controller 110 specifies a target virtual page by referring to a virtual page number 713 corresponding to a virtual volume number 711 and an LBA 712 designated by the Read request, and specifies a real page allocated to the target virtual page as a target real page by referring to an allocated real page number 714, thereby determining whether or not the access pattern for the target real page is a sequential access. When it is determined that the access pattern is not a sequential access (No), in S1720, the controller 110 performs first Read processing and finishes this flow. When it is determined that the access pattern is a sequential access (Yes), in S1730, the controller 110 performs second Read processing and finishes this flow.

The selection Read processing described above enables the storage apparatus 100 to switch between the first Read processing and the second Read processing in accordance with an access pattern for a target real page. Consequently, when target real pages are accessed at random, data stored in the target real page can be immediately migrated from T4 to T3 to prevent a subsequent access to the storage apparatus 200 based on an access to the migrated data. When target real pages are sequentially accessed, data stored in the target real page is not migrated from T4 to T3 until the Read count exceeds a Read count threshold, thereby preventing an access to the storage apparatus 200 due to the occurrence of migration.

Embodiment 2

In the present embodiment, differences from Embodiment 1 are described. As compared with Embodiment 1, the memory 230 in the controller 210 in the storage apparatus 200 further stores an HDD group management table 750 therein.

FIG. 18 illustrates the HDD group management table 750.

The HDD group management table 750 includes an entry for each HDD group. An entry corresponding to one HDD group includes an HDD group name 751, an HDD number 752, and a Write count 753. The HDD group name 751 is an identifier representing an HDD group. The HDD number 752 is an identifier representing a plurality of storage devices 290 included in the HDD group. The Write count 753 is the number of Write I/O for the HDD group.

The management computer 300 follows an instruction from an administrator to transmit an instruction to create the HDD group management table 750 to the storage apparatus 200. The controller 210 in the storage apparatus 200 creates the HDD group management table 750 in accordance with the instruction. The HDD group corresponds to, for example, the above-mentioned EC group.

The controller 210 in the present embodiment performs lower-level Write equalization in response to a lower-level Write request from the storage apparatus 100.

Figure 19:
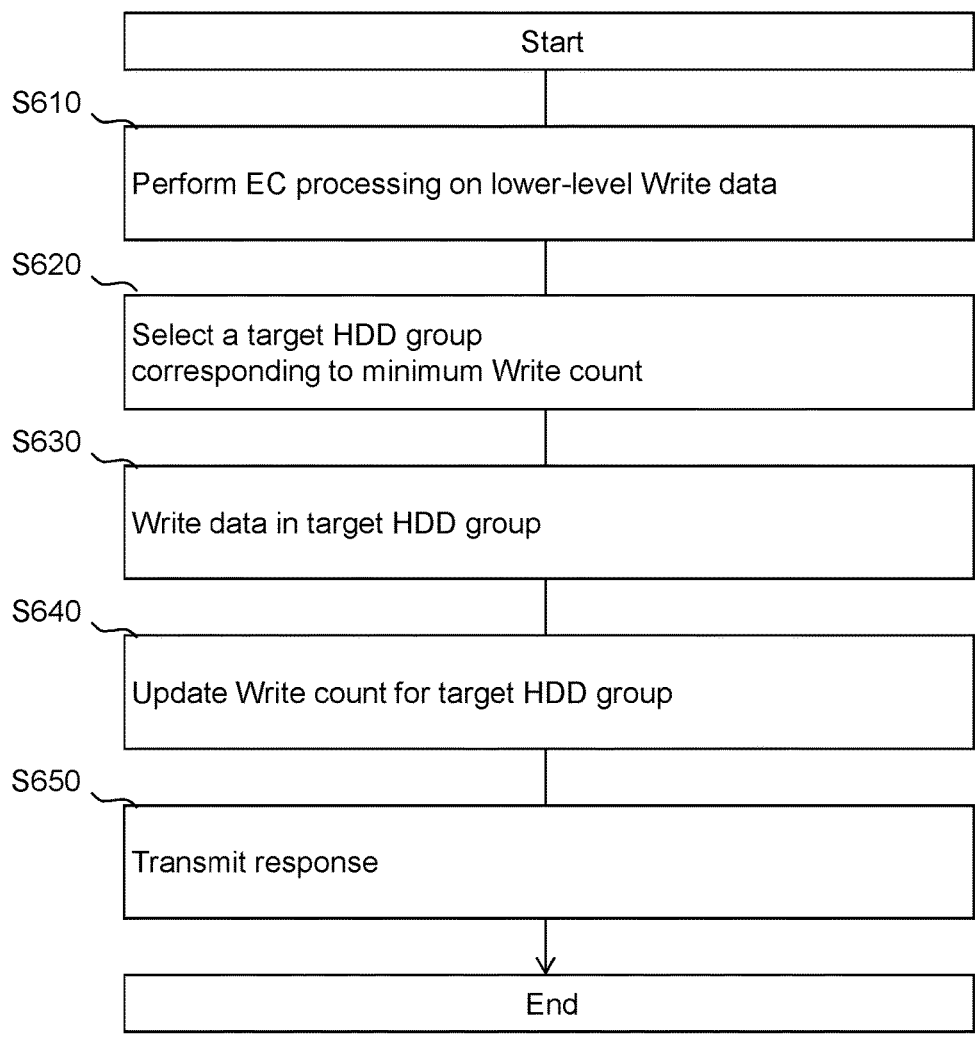
FIG. 19 illustrates lower-level Write equalization.

FIG. 19 illustrates lower-level Write equalization.

In S610, the controller 210 receives a lower-level Write data following the lower-level Write request from the storage apparatus 100, and performs EC processing on the lower-level Write data to generate EC processing data.

After that, in S620, the controller 210 selects an HDD group corresponding to the minimum Write count 753 from among a plurality of HDD groups indicated by the HDD group management table 750 as a target HDD group.

After that, in S630, the controller 210 writes the EC processing data into the target HDD group. The controller 210 writes the EC processing data in a plurality of HDDs belonging to the HDD group in a distributed manner.

After that, in S640, the controller 210 increments the Write count 753 for the target HDD group in the HDD group management table 750 by 1.

After that, in S650, the controller 210 transmits a response to the lower-level Write request to the storage apparatus 100, and finishes this flow.

The controller 120 may use another selection method, such as selecting an HDD group having a Write count smaller than a predetermined Write count threshold and, when a plurality of HDD groups are selected, selecting a target HDD group at random from among the plurality of HDD groups.

The lower-level Write equalization described above enables the storage apparatus 200 to migrate data to an HDD group having the smallest Write count among a plurality of HDD groups, thereby equalizing Write counts for the plurality of HDD groups to prevent the life of a particular storage device 290 from being reduced.

Embodiment 3

Figure 20:
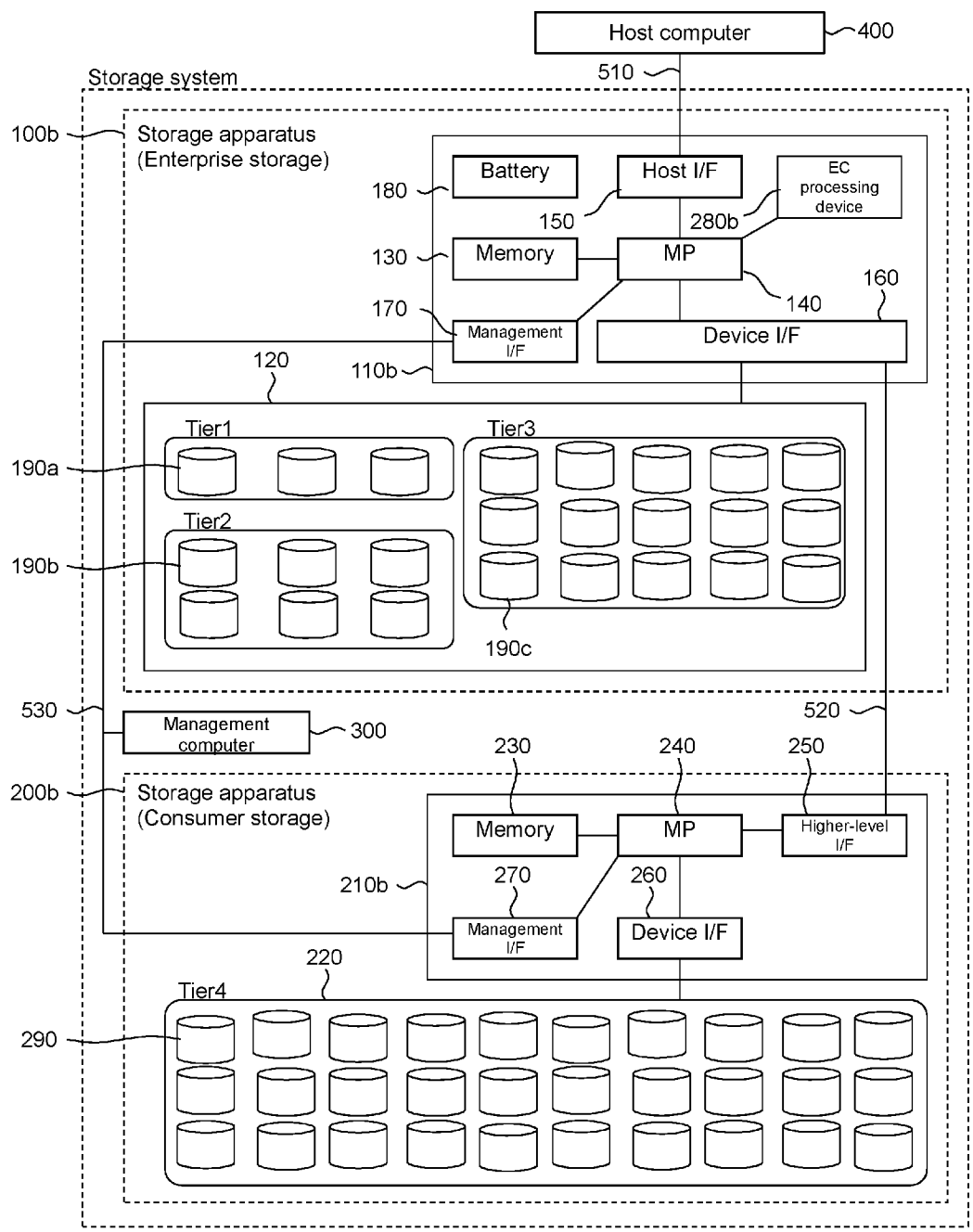
FIG. 20 illustrates a configuration of a storage system in Embodiment 3.

FIG. 20 illustrates a configuration of a storage system in Embodiment 3.

In FIG. 20, elements denoted by the same reference symbols represent the same or corresponding elements. As compared with the storage system in Embodiment 1, the storage system in the present embodiment includes a storage apparatus 100*b* instead of the storage apparatus 100 and a storage apparatus 200*b* instead of the storage apparatus 200. As compared with the storage apparatus 200, the storage apparatus 200*b* includes a controller 210*b* instead of the controller 210. As compared with the controller 210, the controller 210*b* omits the EC processing device 280. As compared with the storage apparatus 100, the storage apparatus 100*b* includes a controller 110*b* instead of the controller 110. As compared with the controller 110, the controller 110*b* includes an EC processing device 280*b* identical or similar to the EC processing device 280. The function of the EC processing device 280*b* may be stored in the memory 130 as a program, and may be executed by the microprocessor 140 in accordance with the program. The memory 130 further stores therein information for managing page addresses after EC processing performed by the storage apparatus 200.

The controller 110*b* in the storage apparatus 100*b* includes the function of the controller 110 and the function of the EC processing device 280*b*. Consequently, the storage system in the present embodiment can perform operations identical or similar to those in the storage systems in Embodiments 1 and 2.

To migrate data stored in a migration page from T3 to T4 by lower-level Write processing, the controller 110*b* controls the EC processing device 280*b* to perform. EC processing on the data stored in the migration page to generate EC processing data, and transmits the EC processing data to the storage apparatus 200*b*. The storage apparatus 200 may perform lower-level Write equalization identical or similar to that in Embodiment 2.

According to the present embodiment, even when the storage apparatus 200*b* does not have the function of EC processing, the storage apparatus 100*b* can transmit data converted through EC processing to the storage apparatus 200, and perform reverse EC processing on data received from the storage apparatus 200*b*. This configuration enables the reliability of the storage apparatus 200*b* to be enhanced. Data to be migrated from the storage apparatus 100 to the storage apparatus 200 by the lower-level Write processing may be either of data before EC processing as in Embodiment 1 or data after EC processing as in Embodiment 2. Similarly, data to be migrated from the storage apparatus 200 to the storage apparatus 100 by Write processing and Read processing may be either of data after reverse EC processing as in Embodiment 1 or data before reverse EC processing as in Embodiment 2.

As the storage apparatus, the storage apparatus 100, 100*b* or the like may be used. As the external storage apparatus, the storage apparatus 200, 200*b* or the like may be used. As the host computer, the host computer 400 or the like may be used. As the controller, the controller 110, 110*b* or the like may be used. As the storage device, the storage device 190 or the like may be used. As the external storage device, the storage device 290 or the like may be used. As the plurality of tiers, Tier1, Tier2, and Tier3 may be used. As the I/O frequency, an I/O count measured periodically may be used. As the specified tier, T3 or the like may be used. As the group, an HDD group or the like may be used. As the first storage device, the storage device 190a, the storage device 190b or the like may be used. As the second storage device, the storage device 190c or the like may be used. As the third storage device, the storage device 290 or the like may be used. As the range, the acceptable range for T3 or the like may be used.

This invention is not limited by the above-mentioned embodiments, and can be changed to other various forms within the range not departing from the gist of the invention.

REFERENCE SIGNS LIST 100, 100b Storage apparatus
110, 110b Controller
120 Storage device group
130 Memory
140 Microprocessor
190a, 190b, 190c Storage device
200, 200b Storage apparatus
210, 210b Controller
220 Storage device group
230 Memory
240 Microprocessor
280, 280b EC processing device
290 Storage device
300 Management computer
400 Host computer

The invention claimed is:

1. A storage apparatus, comprising:
a controller coupled to a host computer and an external storage apparatus; and
a plurality of storage devices coupled to the controller, the controller being configured to:
  allocate, on the basis of respective performances of the plurality of storage devices, the plurality of storage devices to a plurality of tiers;
  create a plurality of logical pages from the plurality of tiers;
  create a plurality of external logical pages from a volume provided by the external storage apparatus;
  create a virtual volume to be provided to the host computer, create a plurality of virtual pages from the virtual volume;
  allocate the logical pages to the virtual pages in response to a write request from the host computer;
  continuously measure an I/O frequency for the logical page, and changes a logical page allocated to the virtual page among the plurality of tiers on the basis of the I/O frequency;
  select, from among logical pages corresponding to a specified tier of the plurality of tiers, a plurality of migration source logical pages satisfying a predetermined migration condition;
  determine whether or not a total size of the plurality of migration source logical pages is equal to or larger than a predetermined size threshold; and
  select, when it is determined that the total size is equal to or larger than the size threshold, a plurality of migration destination external logical pages unallocated to the virtual volume from among the plurality of external logical pages, transmit a write instruction for writing data stored in the plurality of migration source logical pages into the plurality of migration destination external logical pages to the external storage apparatus, specify a plurality of specified virtual pages that are a plurality of virtual pages to which the plurality of migration source logical pages are respectively allocated, and respectively allocate the plurality of migration destination external logical pages to the plurality of specified virtual pages;
wherein the controller is configured to determine, when a request for writing write data in a first virtual page is received from the host computer, whether or not any one of the plurality of external logical pages is allocated to the first virtual page, and select, when it is determined that any one of the plurality of external logical pages is allocated to the first virtual page, a first external logical page allocated to the first virtual page from among the plurality of external logical pages, transmit a first read instruction for reading data stored in the first external logical page to the external storage apparatus, receive first data stored in the first external logical page from the external storage apparatus, update the received first data with the write data, select a first logical page unallocated to the virtual volume from among a plurality of logical pages in the specified tier, write the updated first data into the first logical page, and allocate the first logical page to the first virtual page.

2. The storage apparatus according to claim 1, wherein the controller is configured to determine, when a request for reading read data from a second virtual page is received from the host computer, whether or not any one of the plurality of external logical pages is allocated to the second virtual page, and select, when it is determined that any one of the plurality of external logical pages is allocated to the second virtual page, a second external logical page allocated to the second virtual page from among the plurality of external logical pages, transmit a second read instruction for reading data stored in the second external logical page to the external storage apparatus, receive second data stored in the second external logical page from the external storage apparatus, select, when the second external logical page satisfies a remigration condition set in advance, a second logical page unallocated to the virtual volume from among a plurality of logical pages in the specified tier, write the received second data into the second logical page, and allocate the second logical page to the second virtual page.

3. The storage apparatus according to claim 2, wherein the controller is configured to transmit, when receiving data stored in an external logical page among the plurality of external logical pages from the external storage apparatus, an instruction to invalidate the external logical page to the external storage apparatus.

4. The storage apparatus according to claim 2, wherein the controller is configured to measure a Read count for the second external logical page, and when the Read count is equal to or larger than a predetermined Read count threshold, determine that the second external logical page satisfies the remigration condition.

5. The storage apparatus according to claim 2, wherein the controller is configured to determine, when receiving a Read request for the second virtual page, that the second external logical page satisfies the remigration condition.

6. A storage apparatus, comprising:
a controller coupled to a host computer and an external storage apparatus; and a plurality of storage devices coupled to the controller, the controller being configured to:
allocate, on the basis of respective performances of the plurality of storage devices, the plurality of storage devices to a plurality of tiers;
create a plurality of logical pages from the plurality of tiers;
create a plurality of external logical pages from a volume provided by the external storage apparatus;
create a virtual volume to be provided to the host computer, create a plurality of virtual pages from the virtual volume;
allocate the logical pages to the virtual pages in response to a write request from the host computer;
continuously measure an I/O frequency for the logical page, and changes a logical page allocated to the virtual page among the plurality of tiers on the basis of the I/O frequency;
select, from among logical pages corresponding to a specified tier of the plurality of tiers, a plurality of migration source logical pages satisfying a predetermined migration condition;
determine whether or not a total size of the plurality of migration source logical pages is equal to or larger than a predetermined size threshold; and
select, when it is determined that the total size is equal to or larger than the size threshold, a plurality of migration destination external logical pages unallocated to the virtual volume from among the plurality of external logical pages, transmit a write instruction for writing data stored in the plurality of migration source logical pages into the plurality of migration destination external logical pages to the external storage apparatus, specify a plurality of specified virtual pages that are a plurality of virtual pages to which the plurality of migration source logical pages are respectively allocated, and respectively allocate the plurality of migration destination external logical pages to the plurality of specified virtual pages;
the controller is configured to transmit, after transmitting the write instruction, data stored in the plurality of migration source logical pages to the external storage apparatus;
the transmitted data is subjected to erasure coding (EC) processing by the external storage apparatus; and
the EC-processed data is written into a plurality of specified external storage devices corresponding to the plurality of migration destination external logical pages in the external storage apparatus.

* * * * *